United States Patent [19]

Sando et al.

[11] 4,261,586
[45] Apr. 14, 1981

[54] AUTOMATIC PRESSURE CONTROL DEVICE OF A SIDE SEAL PLATE IN A SEAL MECHANISM OF A HIGH PRESSURE STEAMER

[75] Inventors: Yoshikazu Sando; Hiroshi Ishidoshiro, both of Wakayama, Japan

[73] Assignee: Sando Iron Works Co., Ltd., Wakayama, Japan

[21] Appl. No.: 165,147

[22] Filed: Jul. 1, 1980

[30] Foreign Application Priority Data

Jul. 18, 1979 [JP] Japan ................................ 54-98914

[51] Int. Cl.³ .............................................. F16J 15/54
[52] U.S. Cl. ................... 277/237 R; 277/90; 277/DIG. 7
[58] Field of Search ............... 277/237, DIG. 7, 98, 277/90, 15, 81 R

[56] References Cited

U.S. PATENT DOCUMENTS

| | | | |
|---|---|---|---|
| 1,081,443 | 12/1913 | Godfrey | 277/98 |
| 2,362,363 | 11/1944 | Doede | 277/90 |
| 3,062,555 | 11/1962 | Britton | 277/237 R |
| 3,158,507 | 11/1964 | Alexander | 277/237 R |
| 3,367,667 | 2/1968 | Allen | 277/237 R |
| 3,573,875 | 4/1977 | Zuczek | 277/90 |
| 4,068,854 | 1/1978 | Douglass | 277/237 A |

Primary Examiner—Robert I. Smith
Attorney, Agent, or Firm—Toren, McGeady and Stanger

[57] ABSTRACT

In a side seal mechanism of a high pressure steamer consisting of a pair of seal rubber rolls provided respectively above the cloth inlet and outlet, a seal block to support the seal rubber rolls and a side seal plate, an automatic pressure control device of the side seal plate comprising providing a side seal plate which is supported by means of a seal block so as freely slidable in the axial direction of the seal rubber rolls, a pushing-pressure control screw which is screwed to a support member attached en bloc to the seal block so as movable in the axial direction of the seal rubber rolls, a pressure-push plate movable in the axial direction of the seal rubber rolls in operating the pushing-pressure control screw, and a cushion rubber body interposed between the pressure-push plate and the side seal plate. The pushing-pressure against the side seal plate due to the thermal expansion of the seal rubber rolls can automatically and satisfactorily be absorbed with the use of a cushion rubber body.

3 Claims, 2 Drawing Figures

AUTOMATIC PRESSURE CONTROL DEVICE OF A SIDE SEAL PLATE IN A SEAL MECHANISM OF A HIGH PRESSURE STEAMER

BACKGROUND OF THE INVENTION

The present invention relates to an automatic pressure control device of a side seal plate in a seal mechanism of a high pressure steamer for continuous wet-heat treatment of a cloth at higher temperatures.

There has been disclosed a seal mechanism of a high pressure steamer comprising a pair of seal rubber rolls provided respectively above the cloth inlet and outlet of a high pressure steamer body and a seal frame or block to support the seal rubber rolls freely rotatable. The opening left at the side of the space surrounded with the seal rolls and the seal frame is sealed with the aid of a side seal plate. However, since the seal rolls are heated tolerably in wet-heat treatment, they expand unavoidably to some extent. Therefore, in contacting the side seal plate closely to the seal rolls and the seal frame prior to the operation of the high pressure steamer, severe friction is caused to occur between the side seal plate and the seal rubber rolls due to the thermal expansion of the seal rolls in operating the high pressure steamer, thus rendering the operation impossible. Inversely, in forming a gap between the said members previously in considering the expansion of the seal rubber rolls, the interior of the steamer body can difficultly be elevated sufficiently due to the leakage of the wet-heat, thus causing such a trouble that a long time is needed until a normal operation can be done.

To solve such a drawback, the present applicants have recently proposed an automatic control device of a side seal plate in such a seal mechanism of a high pressure steamer as above-mentioned. The device comprises providing a pressure-push rod for contacting the side seal plate to the sides of the seal rubber rolls and the seal frame, a pressure-sensitive means for pushing the pressure-push rod toward the sides of the seal rolls and the seal frame in accordance with the inner pressure of the high pressure steamer body, and a plurality of metal springs for pressure-pushing the side seal plate to the sides of the seal rolls and the seal frame with a suitable pressure even when the said pressure-sensitive means is not acting. However, this device needs a pressure-sensitive means movable according to the inner pressure of the steamer body for pushing the side seal plate, so that not only the device becomes complicated in total but also its control is troublesome.

SUMMARY OF THE INVENTION

Accordingly, the object of the present invention is to offer a simple and effective automatic pressure control device of a side seal plate in a seal mechanism of a high pressure steamer for the continuous wet-heat treatment of a cloth at higher temperatures to answer the thermal expansion of the seal rubber rolls during operation.

The outline of the invention comprises, in a side seal mechanism of a high pressure steamer consisting of a pair of seal rubber rolls provided respectively above the cloth inlet and outlet of a high pressure steamer body to seal the cloth inlet and outlet, a seal block to support the seal rubber rolls freely rotatable, and a side seal plate in close contact with the ends of the seal rubber rolls and the seal block, providing a side seal plate supported by means of a seal block so as freely slidable in the axial direction of the seal rubber rolls, a pushing-pressure control screw which is screwed to a support member attached en bloc to the seal block so as movable in the axial direction of the seal rubber rolls, a pressure-push plate movable in the axial direction of the seal rubber rolls in operating the pushing-pressure control screw, and a cushion rubber body interposed between the pressure-push plate and the side seal plate.

The pushing pressure against the side seal plate due to the thermal expansion of the seal rubber rolls is absorbed automatically and satisfactorily with the use of a cushion rubber body, so that the seal rubber rolls can be rotated smoothly with no friction and with no leakage of the wet-heat in the interior of the steamer body to proceed the wet-heat treatment of a cloth at higher temperatures effectively with no trouble.

BRIEF DESCRIPTION OF THE DRAWINGS

The drawings are to show an example of the automatic pressure control device of a side seal plate in the present invention.

Figure 1:
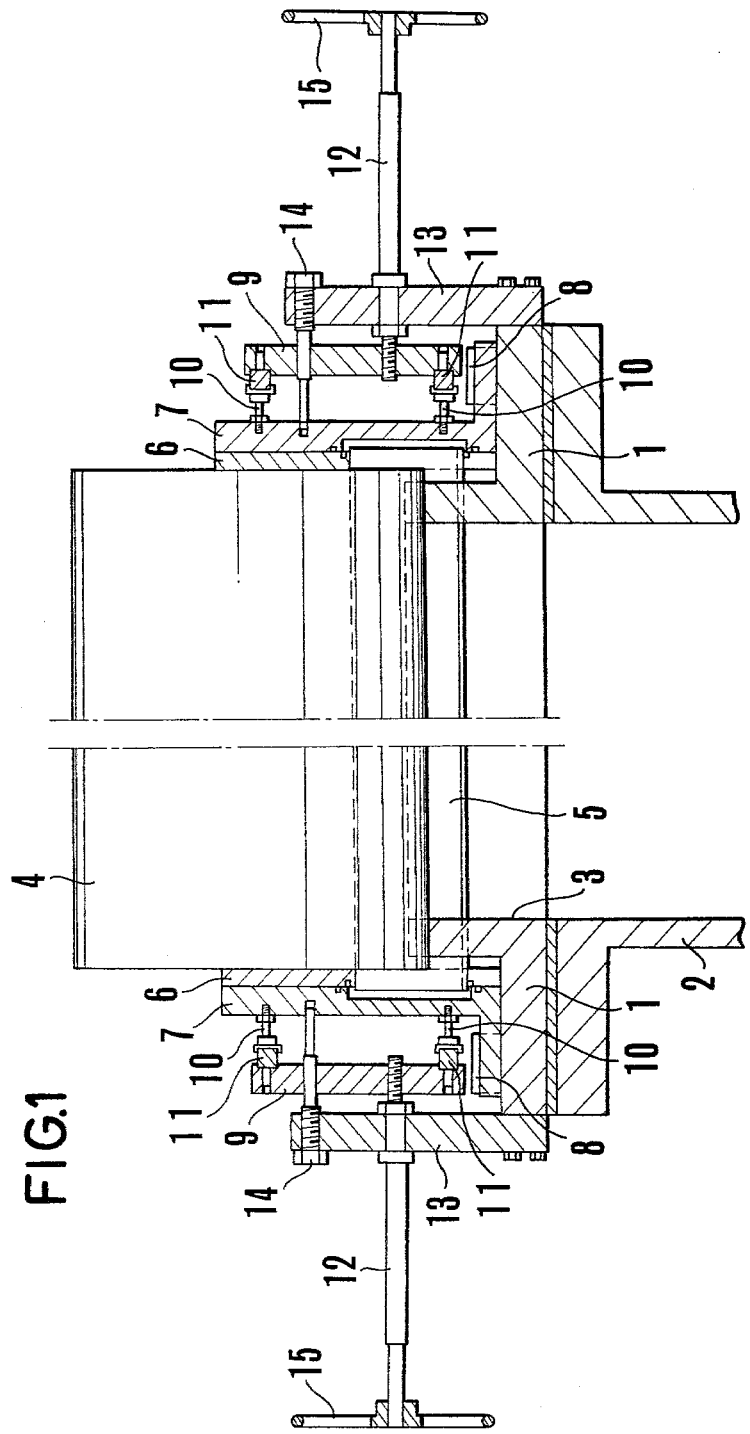
FIG. 1 is a sectional front view of the device in the direction crosswise to the cloth passing through the steamer body.
Figure 2:
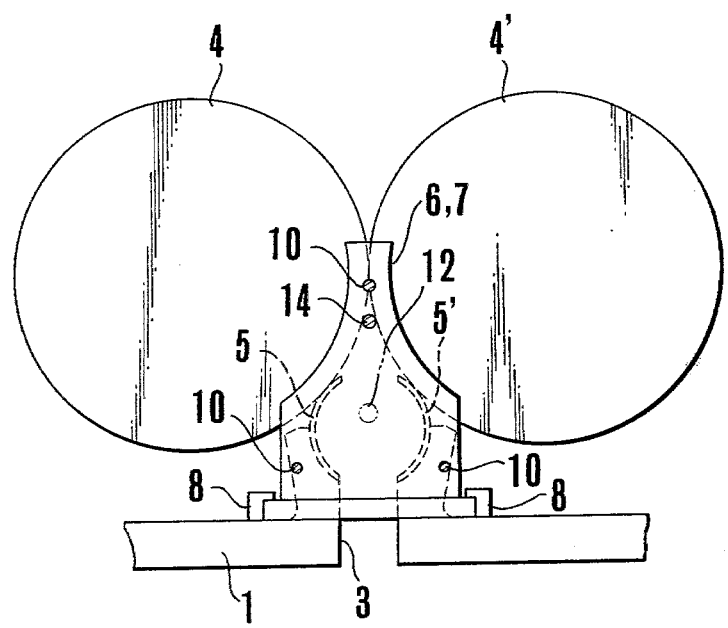
FIG. 2 is a side view thereof.

In the drawings, 1 is a seal block, 2 is a high pressure steamer body, 3 is a cloth inlet or outlet, 4 and 4' are seal rubber rolls, 5 and 5' are seal plates, 6 is a side seal plate, 7 is a metal fitting to support the side seal plate, 8 is a guide metal fitting, 9 is a pressure-push plate, 10 is a gap control rod, 11 is a cushion rubber body, 12 is a pushing-pressure control screw, 13 is a support member, 14 is a center support and 15 is a handle.

DESCRIPTION OF THE PREFERRED EMBODIMENT

An example of the present inventive device will be explained in detail according to the drawings.

1 is a seal block provided above the high pressure steamer body 2. 3 is a cloth inlet or outlet provided through the seal block 1, and 4 and 4' are a pair of seal rubber rolls in pressure contact with each other supported by the seal block 1 freely rotatable at a position above the cloth inlet or outlet 3. 5 and 5' are seal plates, semicircular in section, fixed to the seal block 1 to seal the gap formed between the seal rubber rolls 4 and 4' and the upper opening of the cloth inlet or outlet 3. 6 is a side seal plate to seal the mountain-shaped opening formed respectively at each side of the space surrounded with the seal rubber rolls 4 and 4' and the seal block 1, and 7 is a metal fitting to support the side seal plate 6. The said metal fitting 7 is provided on the seal block 1 so as freely slidable along a guide metal fitting 8 provided on the seal block 1 in the direction parallel to the axes of the seal rubber rolls 4 and 4'. 9 is a pressure-push plate fitted with three gap control rods 10 by putting respectively a cushion rubber body having suitable elasticity 11 therebetween. The head of the gap control rod 10 is screwed to the metal fitting to support the side seal plate, 7. The cushion rubber body 11 serves to absorb the thermal expansion of the seal rubber rolls. 12 is a pushing-pressure control screw whose head being screwed to the pressure-push plate 9. 13 is a support member fixed to the side of the seal block 1 to hold the pushing-pressure control screw 12 by means of a screw. 14 is a center support fixed to the support member 13, which passes through the pressure-push plate 9 and whose head is held by the metal fitting to support the side seal plate, 7, to prevent the rotational movement of the pressure-push plate 9. 15 is a handle provided en bloc with the pushing-pressure control screw to control the position of the pressure-push plate 9.

The function of this device will be explained in the following.

When the seal rubber rolls 4 and 4' are not expanded in starting the operation, the contact pressure between the ends of the seal rubber rolls 4 and 4' and the side seal plate 6 is controlled by handling the handle 15 so as just to contact the said two members closely. The temperature of the interior of the steamer body 2 is then elevated (usually up to about 150° C.) for wet-heat treatment of a cloth. Wet-heat coming up from the interior of the steamer is depressed to some extent by means of the seal plates 5 and 5'. However, the seal rubber rolls 4 and 4' are heated and expand unavoidably, so that the side seal plate 6 and the metal fitting to support the side seal plate, 7, are pressed outwardly in the axial direction of the seal rubber rolls and 4 and 4' due to their thermal expansion. In the present invention, however, the pressure to push the side seal plate and the metal fitting to support the side seal plate, 7, is absorbed in the cushion rubber bodies 11. Therefore, there is no danger of causing friction between the ends of the seal rubber rolls 4 and 4' and the side seal plate 6. The seal rubber rolls 4 and 4' rotate smoothly by holding an appropriate contact pressure between the ends of the seal rubber rolls and the side seal plate 6, and continuous wet-heat treatment of a cloth at higher temperatures can be done effectively with no trouble.

In this way, the present invention is to absorb the pushing pressure of the side seal plate due to the thermal expansion of the seal rubber rolls with the use of the cushion rubber body 11, so that the trouble due to the thermal expansion of the seal rubber rolls can be dissolved effectively by a very simple construction. Since the seal rubber rolls 4 and 4' are in pressure contact with the side seal plate 6 from the commencement of the operation, the interior of the steamer body reaches promptly to a stationary state under prescribed temperature and pressure with no leakage of the wet-heat therein, thus increasing the efficiency of the steamer body. Furthermore, a plurality of gap control rods 10 respectively fitted with a cushion rubber body 11, three pieces in the example, may be applied, so that pressing of the seal rolls can be done quite uniformly. In contrast to the use of a metal spring, whose restorative power of elasticity being different unavoidably with one another to some extent, since the elasticity of the rubber body can be made quite uniform, the use of cushion rubber body is more convenient for sealing a high pressure steamer uniformly and effectively. Thus, the construction of an automatic pressure control device with the use of a cushion rubber body in the present invention is simpler than useing a metal spring as in the prior art.

What is claimed is:

1. An automatic pressure control device of a side seal plate in a seal mechanism of a high pressure steamer; the said seal mechanism being consisted of a pair of seal rubber rolls provided respectively above the cloth inlet and outlet of a high pressure steamer body to seal the cloth inlet and outlet, a seal block to support the seal rubber rolls freely rotatable, and a side seal plate in close contact with the ends of the seal rubber rolls and the seal block; comprising providing a side seal plate which is supported by means of a seal block so as freely slidable in the axial direction of the seal rubber rolls, a pushing-pressure control screw which is screwed to a support member attached en bloc to the seal block so as freely movable in the axial direction of the seal rubber rolls, a pressure-push plate movable in the axial direction of the seal rubber rolls in operating the pushing-pressure control screw, and a cushion rubber body interposed between the pressure-push plate and the side seal plate.

2. An automatic pressure control device set forth in claim 1, in which the said cushion rubber body is divided into a plurality of pieces.

3. An automatic pressure control device set forth in claim 1, which further comprises providing a pair of seal plates fixed to the seal block in the gap formed between the seal rubber rolls and the upper opening of the cloth inlet or outlet.

* * * * *